(12) United States Patent
Dilger et al.

(10) Patent No.: US 8,127,399 B2
(45) Date of Patent: Mar. 6, 2012

(54) SELF-PROPELLED VACUUM-CLEANING DEVICE

(75) Inventors: Horst Dilger, Morsbach (DE); Dieter Kaffenberger, Wiehl (DE); Klaus-Dieter Riehl, Drolshagen (DE)

(73) Assignee: Wessel-Werk GmbH & Co. KG, Reichshof-Wildbergerhuette (DE)

( * ) Notice: Subject to any disclaimer, the term of this patent is extended or adjusted under 35 U.S.C. 154(b) by 1097 days.

(21) Appl. No.: 11/636,917

(22) Filed: Dec. 11, 2006

(65) Prior Publication Data

US 2007/0136981 A1 Jun. 21, 2007

(30) Foreign Application Priority Data

Dec. 20, 2005 (EP) .................................... 05027937

(51) Int. Cl.
*E01H 1/08* (2006.01)
*A47L 5/00* (2006.01)

(52) U.S. Cl. .......................... 15/340.1; 15/340.3; 15/319
(58) Field of Classification Search .................... 15/319, 15/339, 340.1, 340.3, 352

See application file for complete search history.

(56) References Cited

U.S. PATENT DOCUMENTS

| 4,306,329 A * | 12/1981 | Yokoi ............................. 15/319 |
| 5,787,545 A | 8/1998 | Colens |
| 6,457,206 B1 * | 10/2002 | Judson ........................... 15/320 |
| 6,956,348 B2 * | 10/2005 | Landry et al. .................. 318/580 |
| 7,059,012 B2 * | 6/2006 | Song et al. ..................... 15/340.3 |
| 7,320,149 B1 * | 1/2008 | Huffman et al. ................ 15/320 |
| 2004/0195012 A1 | 10/2004 | Song et al. |
| 2004/0262060 A1 | 12/2004 | Kim |

FOREIGN PATENT DOCUMENTS

| EP | 0 803 224 | 10/1997 |
| EP | 1 547 512 | 6/2005 |
| GB | 2 344 748 | 6/2000 |
| JP | 02 307420 | 12/1990 |
| WO | WO 01/06905 | 2/2001 |

* cited by examiner

Primary Examiner — Dung Van Nguyen
(74) Attorney, Agent, or Firm — Collard & Roe, P.C.

(57) ABSTRACT

A self-propelled vacuum-cleaning device for cleaning smooth and textile floor coverings, particularly in the private home sector. The device has a housing, a vacuum blower, an electrically driven cleaning roller, an electrical drive mechanism, control electronics, and a power source. The maximal electric power of the self-propelled vacuum-cleaning tool lies between 150 watts and 300 watts during cleaning operation, whereby between 120 watts and 220 watts are allocated to the vacuum blower, between 10 watts and 40 watts are allocated to the electrical roller drive for the cleaning roller, and between 5 watts and 40 watts are allocated to the drive mechanism, and whereby the control electronics have a power demand of less than 5% of the maximal electric power.

9 Claims, 1 Drawing Sheet

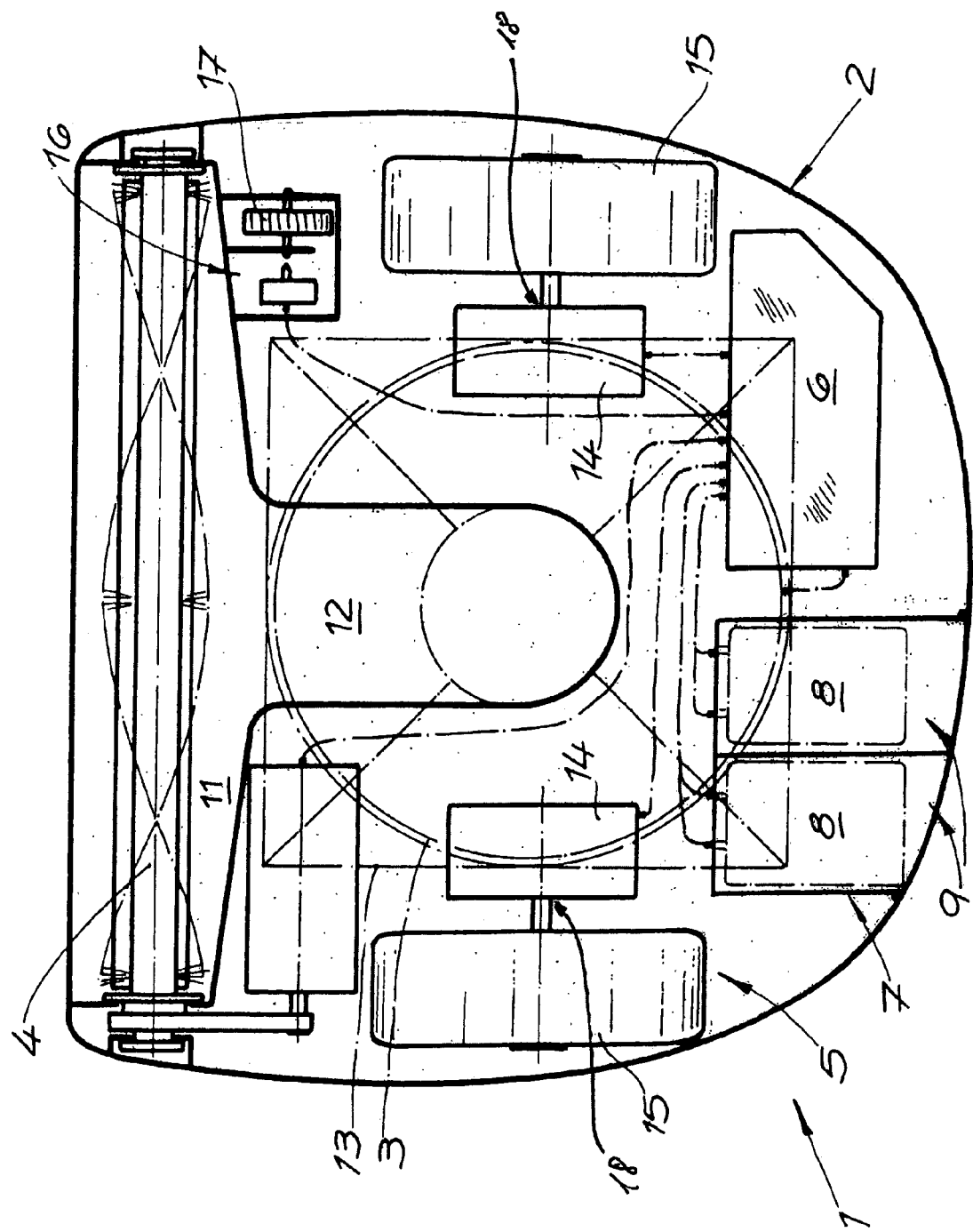

SELF-PROPELLED VACUUM-CLEANING DEVICE

BACKGROUND OF THE INVENTION

1. Field of the Invention

The invention relates to a self-propelled vacuum-cleaning device for cleaning smooth and textile floor coverings, particularly in the private home sector. The device has a housing, a vacuum blower, an electrically driven cleaning roller, an electrical drive mechanism, control electronics, and a power source.

2. The Prior Art

Self-propelled vacuum-cleaning devices are described in U.S. Pat. No. 5,787,545 and European Patent No. EP 0 803 224 B1, and in various embodiments from practice. The known embodiments have a rechargeable battery as a power source, which is manually or automatically charged in a charging station during breaks in operation. During cleaning, the self-propelled vacuum-cleaning devices are controlled by the control electronics, which act on the electrical drive mechanism. Various contact sensors or sensors that work without contact can be provided to recognize barriers and walls. It is also known to store the traveled path in the memory of the control electronics in the form of an electronic card, thereby making it possible to clean a complete area within as short a time as possible. With a typical power demand of up to 40 watts, the working time until the rechargeable batteries have been discharged is about one hour. According to U.S. Pat. No. 5,787,545, the vacuum-cleaning tool is supposed to have low dimensions and a low maximal electric power of at most 100 watts, whereby typically, at most 5 to 10 watts are allocated to the vacuum blower and 2 to 3 watts are allocated to motors of the drive mechanism. The known vacuum-cleaning tools are suitable for removing coarse, loose particles such as crumbs and lint from smooth floor coverings. However, their cleaning effect on textile floor coverings is insufficient.

SUMMARY OF THE INVENTION

It is therefore an object of the invention to provide a self-propelled vacuum-cleaning device that demonstrates acceptable cleaning capacity both on smooth floor coverings and on textile floor coverings.

This object is accomplished, according to the invention, by providing a self-propelled vacuum cleaning device where the maximal electric power lies between 150 watts and 300 watts during cleaning. With this wattage, between 120 watts and 220 watts are allocated to the vacuum blower, between 10 watts and 40 watts are allocated to the electrical roller drive for the cleaning roller, and between 5 watts and 40 watts are allocated to the drive mechanism. The control electronics have a power demand of less than 5% of the maximal electric power. The maximal electric power of the self-propelled vacuum-cleaning device relates to the sum of the maximal electric power values of the individual components. According to the invention, relatively balanced vacuuming properties on smooth floors and textile floor coverings can be reached in the indicated range of the maximal electric power, whereby the required capacity of the power source is not disproportionately great. In the case of a lower maximal electric power of the self-propelled vacuum-cleaning tool, the components would have to be designed to be weaker, and effective cleaning of textile floor coverings would not be possible independent of how the power were distributed among the individual components. In the case of an increase of the maximal electric power above the indicated range, power sources would be required that are comparatively heavy and disadvantageous for that reason. Above the maximal electric power indicated, it must also be stated that even in the case of an optimal power distribution, the cleaning result does not increase proportional to the electric power, and that a disproportionately great additional expenditure of electric power is necessary for an increase in the cleaning result. The allocation of the electric power to the components of the self-propelled vacuum-cleaning device is also essential to the invention, where the great majority of the electric power is intended for the vacuum blower.

The control electronics typically have various contact sensors or sensors that function without contact, and at least one electronic control of the drive mechanism. Suitable contact-free sensors can be structured, for example, as acoustical, electromagnetic, or optical transmission and reception units. The electric power required for the control electronics is independent, to a great extent, of the remainder of the design, and of the weight of the vacuum-cleaning tool, and does not contribute directly to the rated vacuuming power, which is determined by the vacuum blower and the roller drive. According to the invention, the self-propelled vacuum-cleaning device is therefore dimensioned so that less than 5% of the maximal electric power is allocated to the control electronics.

The electric power to be applied for the drive mechanism also does not result in an improvement of the vacuuming power of the vacuum-cleaning tool, and for this reason, in the preferred embodiment of the invention, this power is less than 15% of the maximal electric power of the vacuum blower.

Preferably, a rechargeable battery unit is provided as the power source. A rechargeable battery unit having a capacity of at least 100 Wh, with which the self-propelled vacuum-cleaning device can be operated for about 30 minutes, is suitable. Within the scope of the invention, manual recharging or automatic recharging in a charging station, to which the vacuum-cleaning tool returns automatically, can be provided. It is also possible that a discharged rechargeable battery unit is replaced with a charged rechargeable battery unit, manually or automatically, for example in the charging station, thereby making it possible to extend the period of operation without a long interruption. In an alternative embodiment of the invention, a fuel cell is provided as a power cell. The fuel cell, which is preferably operated with methane, can be quickly refilled and has a high energy density relative to its weight.

In one embodiment, the roller drive, the maximal electric power of which is at most 40 watts, i.e. ⅓ of the power of the vacuum blower, drives a single cleaning roller disposed in a brush chamber in the housing through which the vacuuming air flows. With this arrangement, crumbs, lint, and dust can be effectively loosened and removed from smooth floor coverings and from the fibers of textile floor coverings. A brush roller or a blade roller with continuous or segmented soft blades can be used as the cleaning roller.

The travel direction and speed can easily controlled by using two drive motors in the drive mechanism. Each drive motor has a drive wheel assigned to it, and steering of the vacuum-cleaning tool takes place by variably turning the drive motors on and off. Good maneuverability is also guaranteed by such an embodiment.

To optimize the vacuuming properties, while keeping the energy consumption of the vacuum-cleaning tool as low as possible, a variable power control of the roller drive assigned to the cleaning roller and/or of the vacuum blower and/or of the drive mechanism, as a function of the composition of the floor covering and/or the degree of dirtiness, is provided. By controlling the drive mechanism, a lower travel speed can be provided on textile floor coverings than on smooth floors. By reducing the travel speed, more intensive cleaning of the floor covering is possible. On smooth floor coverings, dirt particles are relatively easy to remove, so sufficient cleaning can usually be achieved even at a higher speed of travel. Additionally or alternatively to varying the travel speed, the speed of rotation of the vacuum blower can also be regulated. In order to loosen dirt from the fibers of a textile floor covering, a great vacuuming air stream and a correspondingly high speed of rotation of the vacuum blower are typically required. On smooth floor coverings, in contrast, dirt particles loosened by the cleaning roller can be reliably picked up even at a lower vacuuming power, i.e., at a lower speed of rotation of the vacuum blower.

To optimize the vacuuming properties, the drive mechanism can have a device for height adjustment, which can be manually activated or is controlled automatically, as a function of the composition of the floor covering. A height adjustment of the drive mechanism that is dependent on the composition of the floor covering can also be provided. Thus, the vacuum-cleaning tool can be passed over the floor covering at a very low height on smooth floor coverings, thereby guaranteeing effective pick-up of dirt particles. On textile floor coverings, if the vacuum-cleaning tool is at too low a height, it may come to rest on the floor and become stuck on the floor by means of the vacuuming air stream.

Sufficient traction between the drive mechanism and textile floor covering is then not guaranteed. By adjusting the height of the drive mechanism, the distance between vacuum-cleaning tool and floor covering can be varied, thereby making it possible to achieve good vacuuming results even on different types of textile floor coverings, such as carpeting or long-pile carpets.

BRIEF DESCRIPTION OF THE DRAWINGS

Other objects and features of the present invention will become apparent from the following detailed description considered in connection with the accompanying drawing. It is to be understood, however, that the drawing is designed as an illustration only and not as a definition of the limits of the invention.

The single FIGURE shows a schematic representation of the components of a self-propelled vacuum-cleaning device.

DETAILED DESCRIPTION OF THE PREFERRED EMBODIMENT

The single FIGURE shows a self-propelled vacuum-cleaning device for cleaning smooth and textile floor coverings, for example in the private home sector. A vacuum blower 3, an electrically driven cleaning roller 4, an electrical drive mechanism 5, control electronics 6, and a power source 7 are disposed in a housing 2. The maximal electric power of self-propelled vacuum-cleaning device 1 lies at 225 watts, whereby 170 watts are allocated to vacuum blower 3, 25 watts are allocated to the electrical roller drive for cleaning roller 4, 25 watts are allocated to drive mechanism 5, and 5 watts are allocated to control electronics 6, including the sensors, not shown, and displays. A rechargeable battery unit 8 having a capacity of 150 watts is provided as power source 7. Recharging of the rechargeable battery unit takes place in a charging station to which the self-propelled vacuum-cleaning device 1 automatically returns before rechargeable battery unit 8 has been completely discharged. With a charged rechargeable battery unit 8, vacuuming for at least 40 minutes is possible, and energy reserves remain for a return of the vacuum-cleaning device to the charging station. Two insertion places 9 for accommodating a rechargeable battery unit 8 are provided in housing 2, so that automatic or manual replacement of rechargeable battery unit 8 is also possible in a simple manner. Alternatively, a fuel cell can also be provided as a power source 7.

A brush roller, which is disposed in a chamber 11 in housing 2 through which the vacuuming air flows, is used as a cleaning roller 4. Alternatively, a blade roller can also be used, which is equipped with continuous or segmented soft blades. Chamber 11 is followed by an air channel 12 that leads to a dust collection container 13, in which the dirt particles that are picked up are collected in a bag. Dust collection container 13 is followed by the vacuum blower 3. The drive mechanism has two drive motors 14, each of which has a drive wheel 15 assigned to it, whereby steering of vacuum-cleaning tool 1 takes place by means of variably turning drive motors 14 on and off. A sensor 16 is provided at the bottom of vacuum-cleaning tool 1, to determine the composition of the floor covering. In the embodiment shown, sensor 16 has a contact element 17, for example in the form of a measurement roller, which has a spring applied to it. The extension of the spring, i.e. the penetration depth of the contact element onto the floor covering, is measured electronically and transmitted to control electronics 6. As a function of the composition of the floor covering, a height adjustment 18 of drive mechanism 5 and a variable power control of the roller drive assigned to cleaning roller 4, of vacuum blower 3, and of drive mechanism 5 are provided.

On a short-pile carpet, the vacuum-cleaning device is moved over the floor covering at a medium height setting, with maximal travel speed and maximal speed of rotation of the vacuum blower. In the case of a long-pile carpet, the height adjustment of drive mechanism 5 is set in such a manner that the distance between vacuum-cleaning device 1 and floor covering is maximal. Vacuum blower 3 is operated at maximal speed of rotation, whereby the travel speed is reduced in order to improve the cleaning effect. With a smooth floor covering, in contrast, sufficient cleaning can be achieved at a maximal travel speed and with a lower speed of rotation of vacuum blower 3. The power demand of vacuum-cleaning device 1 is reduced by reducing the speed of rotation of vacuum blower 3, so that the maximal possible operating time is extended.

Accordingly, while only a few embodiments of the present invention have been shown and described, it is obvious that many changes and modifications may be made thereunto without departing from the spirit and scope of the invention.

What is claimed is:
1. A self-propelled vacuum-cleaning device for cleaning smooth and textile floor coverings, comprising:
   a housing;
   a vacuum blower in the housing;
   a cleaning roller driven by an electrical drive, in the housing;
   an electrical drive mechanism in the housing;
   control electronics disposed within the housing,
   a power source connected to the vacuum blower, electrical drive of the roller, electrical drive mechanism and control electronics; and
   a variable power control of the drive assigned to the vacuum blower or of the drive mechanism, said power control varying the power supplied as a function of a composition of the floor covering or of a degree of dirtiness, wherein a maximal electric power of the self-propelled vacuum-cleaning device lies between 150 watts and 300 watts during cleaning, wherein between 120 watts and 220 watts are allocated to the vacuum blower, between 10 watts and 40 watts are allocated to the electrical drive for the cleaning roller, and between 5 watts and 40 watts are allocated to the drive mechanism, and wherein the control electronics have a power demand of less than 5% of the maximal electric power.

2. A self-propelled vacuum-cleaning device according to claim 1, wherein a maximal electric power of the drive mechanism is less than 15% of a maximal electric power of the vacuum blower.

3. A self-propelled vacuum-cleaning device according to claim 1, wherein the power source is a rechargeable battery unit.

4. A self-propelled vacuum-cleaning device according to claim 1, wherein the power source is a fuel cell.

5. A self-propelled vacuum-cleaning device according to claim 1, wherein the cleaning roller is configured as a brush roller or a blade roller with continuous or segmented soft blades.

6. A self-propelled vacuum-cleaning device according to claim 1, wherein the drive mechanism has two drive motors, each of which has a drive wheel assigned to it, and wherein steering of the vacuum-cleaning tool takes place by variably turning the drive motors on and off.

7. The self-propelled vacuum-cleaning device according to claim 1, wherein the drive mechanism has a device for height adjustment, which can be manually activated or is controlled automatically, as function of the composition of the floor covering.

8. A self-propelled vacuum-cleaning device for cleaning smooth and textile floor coverings, comprising:
  a housing;
  a vacuum blower in the housing;
  a cleaning roller driven by an electrical drive, in the housing;
  an electrical drive mechanism in the housing;
  control electronics disposed within the housing;
  a power source connected to the vacuum blower, electrical drive of the roller, electrical drive mechanism and control electronics; and
  a variable power control of the drive assigned to the drive mechanism, said power control varying the power supplied as a function of a composition of the floor covering,
  wherein a maximal electric power of the self-propelled vacuum-cleaning device lies between 150 watts and 300 watts during cleaning, wherein between 120 watts and 220 watts are allocated to the vacuum blower, between 10 watts and 40 watts are allocated to the electrical drive for the cleaning roller, and between 5 watts and 40 watts are allocated to the drive mechanism, and wherein the control electronics have a power demand of less than 5% of the maximal electric power, and
  wherein the drive of the drive mechanism is programmed so that a lower travel speed is provided on textile floor coverings than on smooth floor coverings.

9. A self-propelled vacuum-cleaning device for cleaning smooth and textile floor coverings, comprising:
  a housing;
  a vacuum blower in the housing;
  a cleaning roller driven by an electrical drive, in the housing;
  an electrical drive mechanism in the housing;
  control electronics disposed within the housing;
  a power source connected to the vacuum blower, electrical drive of the roller, electrical drive mechanism and control electronics; and
  a variable power control of the drive assigned to the vacuum blower, said power control varying the power supplied as a function of a composition of the floor covering,
  wherein a maximal electric power of the self-propelled vacuum-cleaning device lies between 150 watts and 300 watts during cleaning, wherein between 120 watts and 220 watts are allocated to the vacuum blower, between 10 watts and 40 watts are allocated to the electrical drive for the cleaning roller, and between 5 watts and 40 watts are allocated to the drive mechanism, and wherein the control electronics have a power demand of less than 5% of the maximal electric power, and wherein the vacuum blower is programmed to have a higher speed of rotation on textile floor coverings than on smooth floor coverings.

* * * * *